(12) United States Patent
Kadaba et al.

(10) Patent No.: US 7,912,765 B2
(45) Date of Patent: Mar. 22, 2011

(54) METHOD AND SYSTEM FOR GATHERING DATA

(75) Inventors: Nagesh Kadaba, Roswell, GA (US); Christopher T. Schenken, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 918 days.

(21) Appl. No.: 11/219,131

(22) Filed: Sep. 1, 2005

(65) Prior Publication Data

US 2007/0047459 A1 Mar. 1, 2007

(51) Int. Cl.
*G06F 15/20* (2006.01)

(52) U.S. Cl. .......... 705/28; 340/252; 700/222; 235/375; 235/380

(58) Field of Classification Search ................ 705/28; 340/252; 700/222; 235/375, 380
See application file for complete search history.

(56) References Cited

U.S. PATENT DOCUMENTS

| | | | | |
|---|---|---|---|---|
| 4,005,400 | A * | 1/1977 | Engdahl | 341/5 |
| 4,752,965 | A * | 6/1988 | Dunkley et al. | 382/119 |
| 4,783,740 | A * | 11/1988 | Ishizawa et al. | 705/28 |
| 5,661,291 | A * | 8/1997 | Ahearn et al. | 235/462.46 |
| 6,233,565 | B1 * | 5/2001 | Lewis et al. | 705/35 |
| 6,285,916 | B1 | 9/2001 | Kadaba | |
| 6,865,577 | B1 | 3/2005 | Sereda | |
| 2002/0104026 | A1 * | 8/2002 | Barra et al. | 713/202 |
| 2003/0114206 | A1 | 6/2003 | Timothy et al. | |
| 2005/0187836 | A1 * | 8/2005 | Wolfe | 705/28 |

OTHER PUBLICATIONS

Proof of Delivery; Origin: http://www.ups.com/content/us/en/tracking/help/reference/delivery_proof.html.
Proof of Delivery (P.O.D.); Origin: http://www.ups.com/content/us/en/resources/select/sending/options/confirm.html?WT.svl.=SubNav.
Press Release—UPS Pioneers Real-Time Package Tracking in Hong Kong; Origin: http://www.shareholder.com/ups/ReleaseDetail.cfm?ReleaseID=.76012; Dated: Jul. 20, 1999.
2002 Press Releases—UPS Extending Technology for Customers Around the Globe Expands OnLine Tools, Wireless Access for Shippers Worldwide; Origin: http://www.pressroom.ups.com/pressreleases/archives/archive/0,1363,3570,00.html; Dated: Feb. 11, 2002.
Office Action dated Jun. 16, 2010, Canadian application No. 2,557,342.

* cited by examiner

*Primary Examiner* — Vanel Frenel
(74) *Attorney, Agent, or Firm* — Alston & Bird LLP

(57) ABSTRACT

Embodiments of the present invention seek to provide a cost effective means for gathering data which associates an individual or business with an address for a given time frame. This is accomplished by utilizing resources already providing a service in a geographic area to collect the desired data. In some embodiments, data collected in relation to a service company's regular course of business are made available for other purposes such as proof of occupancy. In other embodiments, service company representatives, in addition to their primary tasks, are dispatched to specific addresses to gather data unrelated to their primary tasks.

16 Claims, 3 Drawing Sheets

METHOD AND SYSTEM FOR GATHERING DATA

FIELD OF THE INVENTION

The present invention generally relates to methods for gathering data. More particularly, embodiments of the present invention relate to gathering data using resources already in the field for other purposes.

BACKGROUND

Often, when obtaining licenses or permits from government agencies, a business or individual will have to show proof of occupancy. It is known to provide utility bills as proof of occupancy; however, these documents cannot by themselves verify that the individual actually resides at the particular address or whether the business actually operates out of the address provided. This creates a security lapse and potential for fraud that may be exploited by criminals and the like. Nevertheless, due to time and monetary constraints, government agencies rarely send representatives into the field to verify the occupancy information provided. Therefore, what is needed is a cost effective method of verifying an individual or business occupies a specific address during a specific time frame to supplement the data already accepted.

Similarly, in the event of a natural disaster, insurance companies and government relief agencies require proof that an individual or business resided at a specific address affected by the disaster before relief is provided. Many times, the necessary documents to show proof of occupancy were destroyed due to the natural disaster or are otherwise not readily accessible. Therefore, what is needed is a system for providing proof of occupancy that is easily accessible.

In summary, a need exists for improved systems and methods to collect data associating a person with a residence or a business with a specific address during a specific time frame to address deficiencies in the current state of the art, some of which are identified above.

BRIEF SUMMARY OF THE INVENTION

The embodiments of the present invention seek to provide cost effective methods and systems for gathering data which associates an individual or business with an address for a given time frame. This may be accomplished by utilizing resources already providing a service in a geographic area to collect the desired data. As used in this application, the term "resources" generally refers to representatives and equipment needed to provide a service. This equipment may include types of transportation (e.g., motor vehicle, bicycle), and/or devices for collecting data and/or transmitting data. In some embodiments, data collected in relation to a service company's regular course of business are made available for other purposes such as proof of occupancy. In other embodiments, service company representatives in addition to their primary tasks, are dispatched to specific addresses to gather data unrelated to their primary tasks.

In one aspect of the present invention, a method of verifying the occupancy of a given address is provided. The method comprises the steps of providing a service in a geographic area other than verifying occupancy and creating data records for instances of providing the service wherein each data record associates an address with an occupant's name, an occupant's signature and a date of service. The data is stored in a data repository. A request for proof of occupancy evidence at a location within the geographic area is received where the request includes an address or an occupant's name. The data repository is queried to identify any data records associated with the request and a determination is made as to whether data records associated with the request exist in the data repository. If data records exist, proof of occupancy evidence is provided based at least in part on the identified records.

In another aspect of the present invention, a method of providing proof of occupancy is provided. This method comprises the steps of delivering a package to a consignee at a destination address and receiving a signature from the consignee and digitizing the signature. A delivery record is created including the consignee's name, the digitized signature, the destination address, and a delivery date. The delivery record is stored in a data repository. A request for proof of occupancy is received that includes the consignee's name, the destination address or an account number associated with the consignee. The data repository is queried to identify the delivery record in response to the request; and proof of occupancy evidence is provided.

In another aspect of the present invention, a method of gathering data is provided. This method comprises the steps of providing a service wherein representatives are dispatched to locations within a geographic area and receiving a request to gather data unrelated to the service and associated with an address that is within the geographic area. One of the representatives is diverted to the address to gather the requested data.

In a further embodiment of the present invention, a method of providing proof of occupancy is provided. The method comprises the steps of providing a service in which representatives are dispatched to locations within a geographic area and equipping the representatives with data acquisition devices. A request is received to gather proof of occupancy evidence associated with an address that is within the geographic area and a representative is dispatched to the address. A signature of an occupant at the address is gathered using one of the data acquisition devices. This signature is associated with the address and access to the record is provided.

BRIEF DESCRIPTION OF THE SEVERAL VIEWS OF THE DRAWINGS

Figure 1:
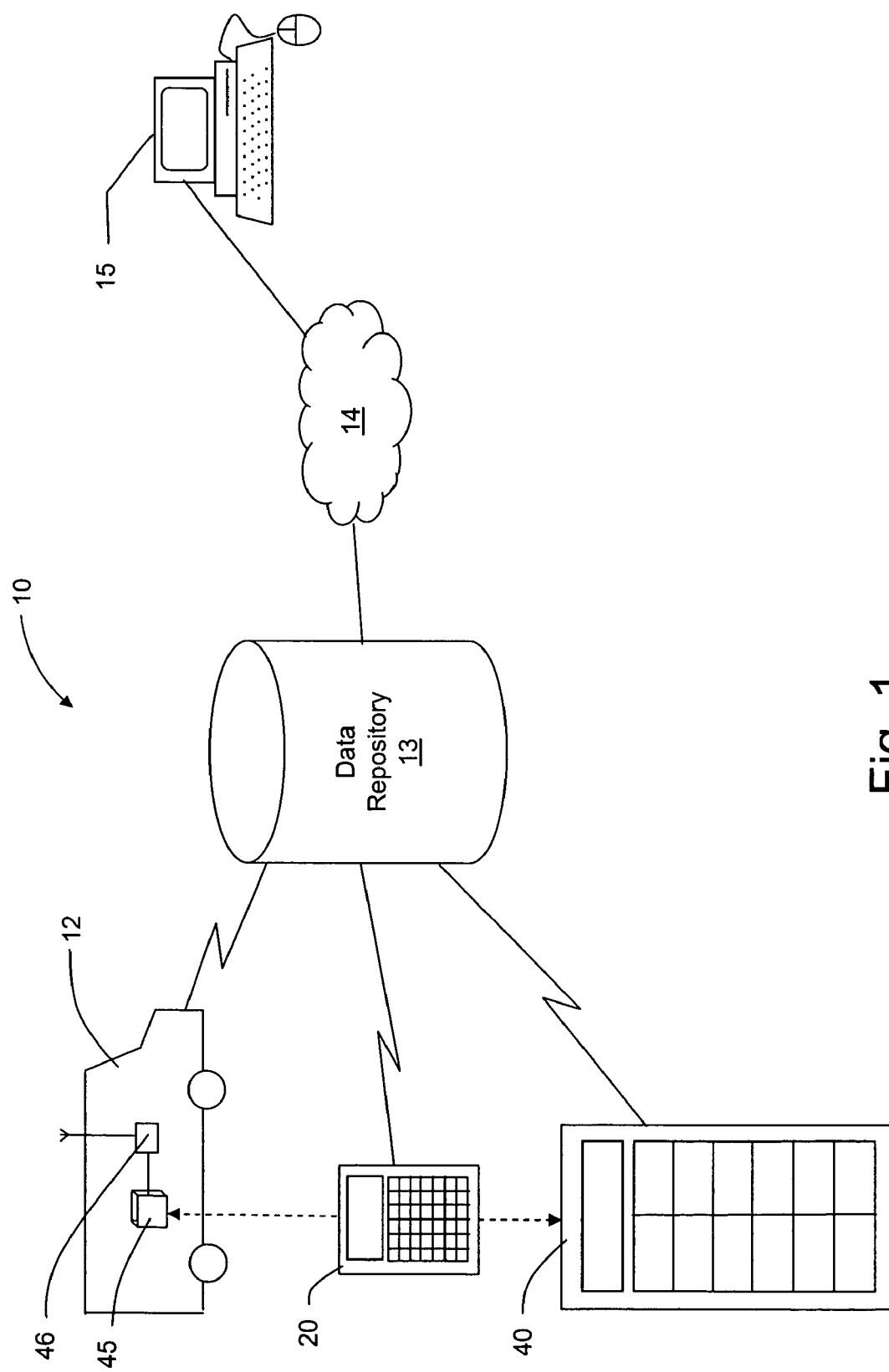

Having thus described the invention in general terms, reference will now be made to the accompanying drawings, which are not necessarily drawn to scale, and wherein:

FIG. 1 is a schematic diagram of an exemplary package tracking system used in connection with an embodiment of the present invention.

Figure 2:
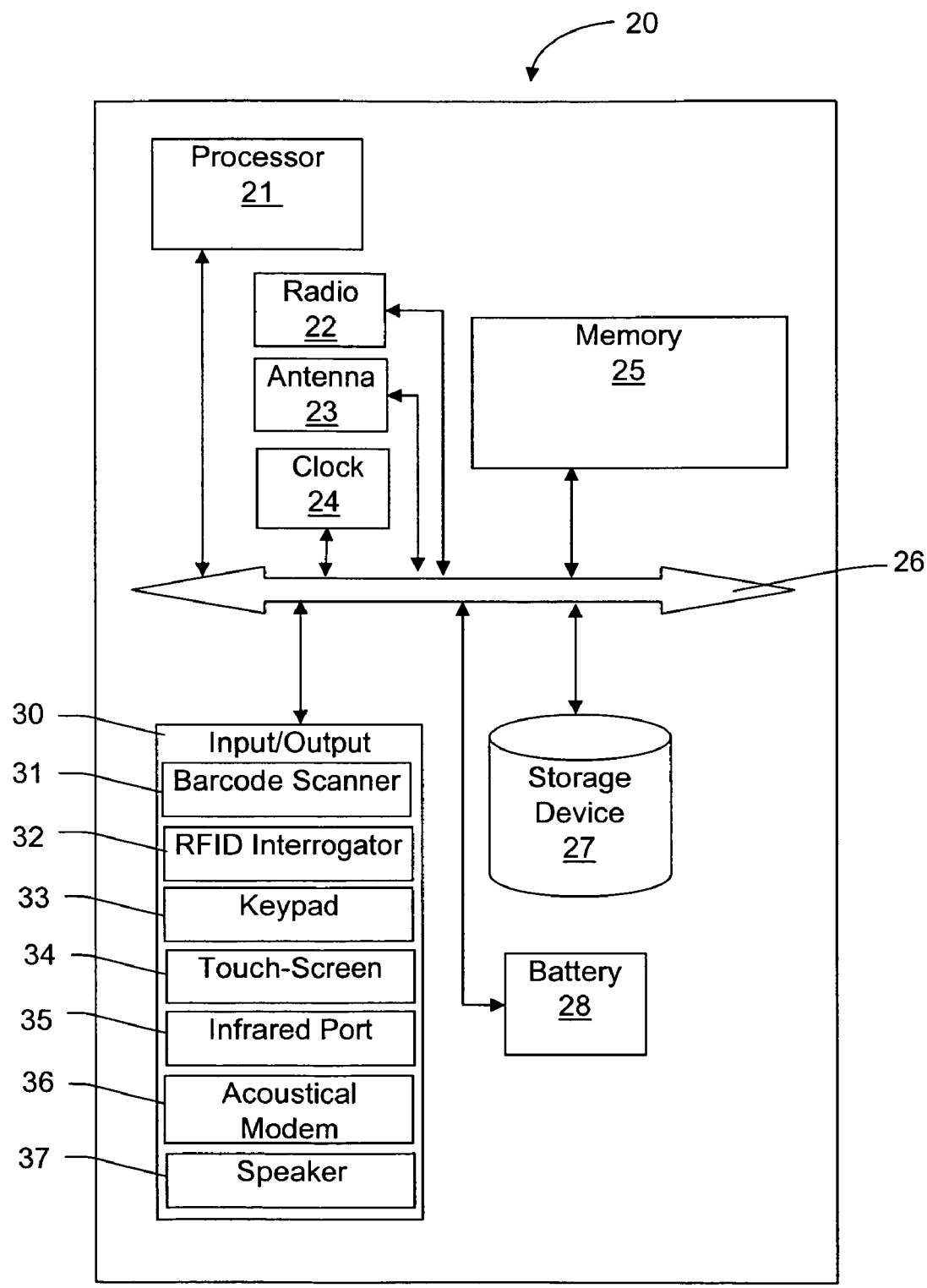

FIG. 2 is a block diagram of an exemplary data acquisition device used in connection with an embodiment of the present invention.

Figure 3:
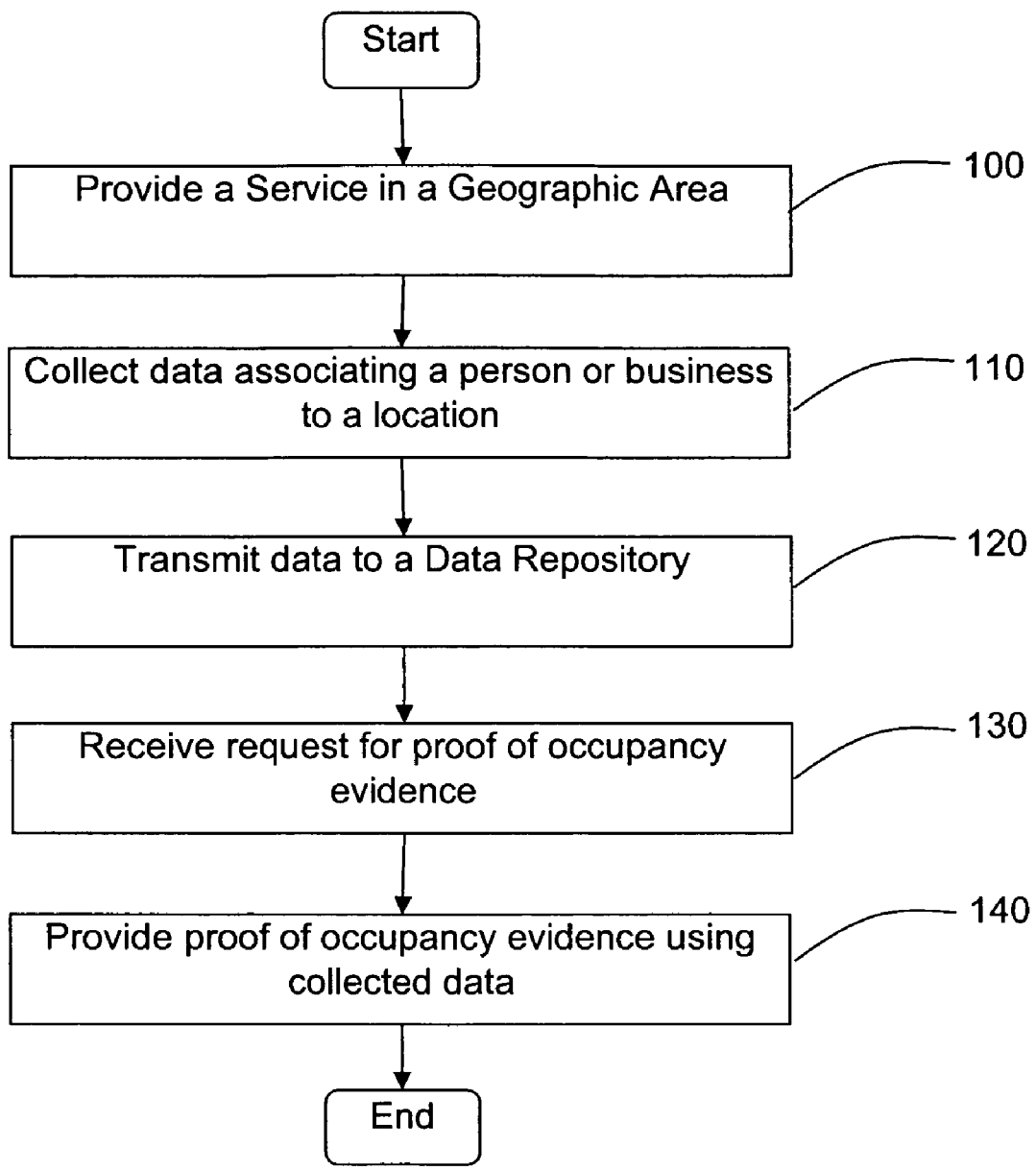

FIG. 3 is a flow diagram illustrating a method in accordance with an embodiment of the present invention.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Embodiments of the present invention generally relates to methods for gathering data using resources that are already in the field for other reasons. In some embodiments, data collected by service companies while providing their service is made available for other purposes such as proof of occupancy. For example, proof of delivery data collected by package delivery companies may be used to prove occupancy on a particular date. In other embodiments, a resource collects predefined data from customers or from specific locations or individuals while they are in the field for other purposes.

Suitable resources used in connection with embodiments of the present invention include without limitation package delivery drivers, utility meter readers, maintenance personnel or other service providers that are dispatched into a geographical area. For ease of understanding, the following paragraphs will describe exemplary embodiments of the present invention using package delivery resources to collect data.

Package Delivery System

A service provided by most package delivery companies is the ability of a shipper or consignee to track packages while in transit. In addition to in transit data, package delivery companies also typically collect data at the destination location to prove the package was successfully delivered. Delivery confirmation data collected at a delivery destination generally includes some type of package identification, the delivery address and may also include a signature of the recipient. Thus, if a question arises regarding the delivery of a package, the shipper or the consignee can request data from the package delivery company showing where the package was delivered and who received the package. This data is stored by the package delivery company in a data repository or database.

FIG. 1 shows a typical package tracking system generally known in the art. The exemplary package tracking system 10 includes a delivery vehicle 12, a data repository 13 (e.g., computer data storage device), a communication network 14, a means for a customer to submit a tracking request, such as a computer 15, and a portable data acquisition device 20. The data acquisition device 20 is also used by a delivery vehicle driver to collect package tracking data, typically at the package delivery location. This device stores the package tracking data, and forwards it to the data repository 13. The data may be forwarded directly to the data repository 13 from the data acquisition device 20 via a wireless connection. Alternatively, data transmission may be facilitated by placing the data acquisition device 20 into a base station 40 or vehicle docking station 45.

The package tracking data is received and stored at the data repository 13 typically in a database format, which may be accessed by customers and/or customer service representatives via communication network 14. Typically, the customer may only access records associated with a particular delivery, but a customer service representative can browse the entire data repository.

In one embodiment, the communication network 14 is the Internet, and customers (e.g., shippers or consignees) utilize one or more graphical user interfaces, such as web pages, to locate and view the delivery status of packages in transit. It should be appreciated by those of skill in the art that the communication network 14 may represent one or more public switched telephone networks (PSTNs), wide area networks (WANs), local area networks (LANs), cellular networks, or other methods of communication. A user may access the communication network using computer 15. Moreover, it should be understood that the computer 15 as used in this application represents any device capable of communicating with a communication network such as without limitation, a desktop computer, notebook computer, a personal data assistant or a cellular phone.

FIG. 2 illustrates an exemplary data acquisition device 20 which includes a processor 21, radio 22, antenna 23, time clock 24, volatile memory 25, system bus 26, storage devices 27, a battery 28 and input/output devices 30. The input/output devices 30 of the data acquisition device 20 may include the bar code scanner 31, RFID interrogator 32, keypad 33, touch-screen 34, infrared communication port 35, acoustical modem 36 and speaker 37. The radio 22 also acts as an input and output device with the aid of the antenna 23. It should be understood that a data acquisition device 20 having any combination of the input/output devices (22, 31-37) may be used in connection with the present invention.

Package tracking data typically collected by the data acquisition device 20 include a package identification (e.g., tracking number), the name of the consignee, the delivery date, and delivery address. This data may be encoded in a symbol such as a barcode, two dimensional code or an RFID tag. Additional package tracking data can include, but is not limited to, package weight, the number of packages shipped as part of a complete group of items shipped, the receipt of payment, recipient or shipper signature, date of pickup or delivery, address of recipient or shipper, and data necessary for the carrier to identify and track the package, as is well known in the art. This data is stored in the storage device 27 of the data acquisition device 20.

The storage device 27 represents at least one storage device, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, the at least one storage device 27 is connected to the system bus 26 by an appropriate interface. The storage devices 27 and their associated computer-readable media provide nonvolatile storage for the data acquisition device 20. The computer-readable media could be replaced by any other type of computer-readable media known in the art now or in the future. Such media may include, for example, magnetic cassette tapes, flash memory cards and digital video disks.

When a package is delivered to an address, the driver, using the data acquisition device 20, captures package identification information such as a tracking number, and a delivery address. The package identification information may be obtained by scanning a symbol or an RFID tag associated with the package or by entering the information using the keypad 33 or touch-screen 34. In addition to the package identification information, the recipient may be asked to sign the data acquisition device's touch-screen 34 where the signature is digitized to create digital signature data that is stored in a storage device 27. The stored signature data may include a graphic image of the signature identifying the person signing or both may be used later to identify who received the package. The collected data (e.g., package identification information, destination address and digitized signature) are time-stamped using the data acquisition device's internal clock 24 and the time-stamp data representing the time of signature by the recipient is stored in the data acquisition device 20 along with the related signature data.

Referring to FIGS. 1 and 2, the data acquisition device 20 has several options for transmitting the collected data to the data repository 13. In one embodiment, the data are communicated to the data repository 13 using the radio 22 and antenna 23. The radio 22 may be configured to utilize any data network protocols and frequencies such as the global system for mobile communications (GSM), general packet radio service (GPRS), dual-mode advanced mobile phone service (AMPS), circuit switched data and code division multiple access (CDMA/1XRTT) and satellite communication via GPS systems such as LEO or DOD. Other network protocols and frequencies are known or may be developed in the art and can be supported as well. This type of connection allows periodic or real-time data transfer of collected data to the data repository 13 for retrieval by a customer or customer service representative.

In a further embodiment, the data acquisition device 20 includes a wireless personal area network (WPAN) data radio (not shown) which provides connectivity between the data acquisition device 20 and corresponding data radios 46 in the delivery vehicle 12. Any wireless communication standard may be used, for example, Bluetooth™ (IEEE 802.15.1 standard compatible) or any other IEEE 802 family of standards. The IEEE 802 family of standards are hereby incorporated by reference in their entirety and made a part hereof. One of ordinary skill in the art will readily recognize that other wireless protocols exist or may be developed that can be used with the present invention. The data received by the data radio in the vehicle would then be transmitted to the data repository 13 via a vehicle data radio 46 configured to use any wireless protocol.

In an alternative embodiment, the data transfer from the data acquisition device 20 to the data repository 13 is facilitated by the infrared communication port 34. In this embodiment, the data acquisition device 20 is placed in a vehicle docking station 45 such that the infrared communication port 35 is held at the proper distance and orientation for communication with an infrared receiver in the vehicle docking station 45. A typical protocol used for this type of transmission is based on Infrared Data Association (IrDA) standards but any protocol for optical transmission of data may be used in connection with this embodiment of the present invention. The data transmitted to the docking station is forwarded to the vehicle data radio 46 and transmitted to the data repository 13 using any wireless protocol.

In another embodiment, a base station 40 is used to facilitate the communication of data from the data acquisition device 20 to the data repository 13. Similar to the vehicle docking station 45, the base station 40 is configured to position the infrared communication port 35 of the data acquisition device 20 at the proper distance and orientation for communication with an infrared receiver in the docking station 40. Base stations are typically located at a dispatch center for the delivery vehicles 12 and may be configured to hold one or more data acquisition devices at a time. In use, a driver positions the data acquisition device 20 in the base station 40 at the end of a shift and retrieves it at the beginning of the following shift. Data stored in the data acquisition device 20 is transferred to the base station 40 via the infrared communication port 35 and then forwarded to the data repository 13 via a radio or land-line connection.

In the event a dispute arises with regard to the delivery of a package, a "proof of delivery" letter can be issued by the package delivery company using package tracking data stored in the data repository 13. The shipper or consignee may request the data via a website using computer 15 or portable device and the tracking number assigned to the delivery in question. Alternatively, the shipper or consignee may contact a customer service representative of the package delivery company to request a proof of delivery letter. A "proof of delivery" letter is issued by the package delivery company typically includes the full delivery address, the date delivered and a reproduction of the signature of the recipient.

Proof of Occupancy

Financial institutions, governmental agencies, and insurance companies often require businesses to show proof of occupancy before providing credit, licenses, or permits, or when making claims. Similarly, individuals often have to provide proof of occupancy or residency when dealing with these same types of entities. However, the necessary proof is not always readily available. In connection with embodiments of the present invention, access to data collected by service personnel already performing other tasks is provided such that businesses and individuals can prove occupancy during a specified time frame.

In one embodiment of the present invention, proof of delivery data gathered by a package delivery company is used for the purpose of establishing proof of occupancy. As previously described, package delivery companies maintain databases containing digitized signatures associated with an address and a date. In this embodiment of the present invention, if a package consignee needs to show proof of occupancy, they can contact the package delivery company and request proof of occupancy evidence such as a proof of occupancy letter showing an address, a signature and an associated date. An individual may use this information for example to obtain a driver's license or to qualify for relief after a natural disaster such as a fire or flood. Additionally, a business may use this data to prove it was in operation on a specific date at a specific location in order for example to obtain a license or permit from a government agency, payment of a claim from an insurer or credit from a financial institution.

To access proof of occupancy information, a user contacts the package delivery company using an Internet website or alternatively contacts a customer representative of the service company via a telephone, by letter, by email or in person (e.g., at a service center). The user provides the consignee's (e.g., individual or business) name and a time frame which are then used to query the data repository 13 and retrieve the relevant records. The time frame may be a specific date, month, year or time period, and the results of the query may be one or more delivery records. In an alternative embodiment, the user provides an address instead of a name. In a further embodiment, the user provides a tracking number. A tracking number is associated with a specific delivery event, and therefore could be used by itself to locate the desired delivery record without supplying additional information.

The requesting party or user is often the consignee. However, it should be understood that the user may be any individual or entity.

For security purposes, a service company may wish to restrict access to data stored in the data repository 13 to those that have established a profile with the service company. A customer profile typically includes the company or customer's name, a billing address and a unique account number. In one embodiment, a user is only granted access to data in the data repository 13 associated with their account number which would be provided with the request for data. In another embodiment, a company or individual having an account also establishes a password or PIN which is then used in conjunction with the account number in order to access the data associated with their account. This provides an additional level of security.

After receiving and accepting the request, a query is run on the data stored in the data repository 13 to obtain the delivery records associated with the information provided by the user. Using this data, proof of occupancy evidence is provided such as a proof of occupancy letter. The proof of occupancy letter would include the delivery address, the date of delivery taken from the time-stamp data and the digitized signature of the recipient. In the case of a business, the letter may also include the business' name. Preferably, the letter is printed on the service company's letterhead thereby indicating who gathered the data. In one embodiment, the proof of occupancy letter is printed from the service company's website. In an alternative embodiment, the letter is printed by the service company and faxed or mailed to the requesting party. Furthermore, proof of occupancy evidence could be transferred electronically or posted on a secure website. The evidence would include the same type of data supplied in the proof of occupancy letter.

FIG. 3 is a process flow diagram illustrating an exemplary method using data collected during the normal course of delivering packages to provide proof of occupancy in accordance with an embodiment of the present invention.

At Step 100, the package delivery company provides delivery services in a geographic area. The service begins when a shipper makes a delivery request to the package delivery company. This request typically includes a destination address and a consignee. As will be appreciated by one of skill in the art, other data may also be provided by the shipper such as the shipper's address, collect on delivery (COD) charges due, a service level specifying a guaranteed delivery date, and other package detail. At this point, the package is assigned a tracking number which will be used by the carrier's tracking system to associate package tracking data with the specific package. This same number may be used by the shipper or the consignee to track the package while it is in transit.

The package then flows through the package delivery company's delivery network en route to the destination address. This may entail passing through several intermediate facilities before reaching the package's final destination. As will be understood by one of skill in the art, the tracking number is captured at the intermediate facilities, time-stamped and stored in the data repository 13 so the delivery progress of the package can be tracked. A more detailed description of how a package may flow through a delivery network is provided in U.S. Pat. No. 6,539,360.

At Step 110, the driver delivers the package to its destination and collects package delivery confirmation data using a data acquisition device 20. The package identification information such as the tracking number and destination address may be captured from a tag or label associated with the package using a barcode scanner 31 or RFID interrogator 32 incorporated into the data acquisition device 20. Alternatively, the information may be entered into the data acquisition device 20 by the driver using the keypad 33 or touch-screen 34. Next, the consignee signs the touch-screen on the data acquisition device 20 which digitizes the signature and stores it along with the other captured data in a storage device 27 for subsequent transmission to the data repository 13.

Data is then transmitted to the data repository 13 at Step 120. This may be accomplished in several different ways. For example, the data may be transmitted wirelessly to the data repository 13 in real-time using radio 22 and antenna 23. Data may also be transferred to a vehicle docking station 45 or base station 40 via an infrared communication port 35 or WPAN and subsequently transferred to the data repository 13.

At Step 130, a request for proof of occupancy data is received and accepted by the service company. The request is received from computer 15 via the communication network 14 or may be received by a customer service provider by telephone, letter, email or in person. The request comprises a name (business or individual), an address or an account number along with a time frame. Alternatively, the request may include a tracking number for a specific delivery event.

At Step 140, the data repository is queried using the information received with the request to identify proof of occupancy evidence. This data may be printed by the requesting party or a hardcopy may be sent by mail or facsimile. Alternatively, the data may be sent electronically via email or accessed via a secured website.

In an alternative embodiment, data is gathered by a service company for the sole purpose of verifying occupancy. In one embodiment, the service company is already operating in the same general geographic area for other reasons. In this embodiment, the service provided by the company could be package delivery, equipment repair (e.g., plumber, electrician, and air conditioner repair), trash pick-up or other service wherein representatives are dispatched into a geographic area. In another embodiment, the service company's primary task is to verify occupancy. In either case, the process begins with an entity requesting confirmation of occupancy. The entity could be a government agency or private entity seeking to verify data already submitted. An address and a name (either business or individual) are provided to the service company, and a service representative equipped with a data acquisition device 20 is routed to the address for the purpose of collecting a signature from the identified person. The address and the digitized signature are entered, time-stamped and stored in the data acquisition device 20 for subsequent transmission to the data repository 13. The requesting entity may be granted access to the data via a website or the data may be sent directly to the entity by email, mail or facsimile.

Government Verification

In addition to proof of occupancy, data collected using embodiments of the present invention may be used to validate addresses of recipients of Medicare, Medicaid or Social Security. In one embodiment, the service company would receive a request from a government agency to verify the address of a specific individual. In the case of a package delivery company, a driver would be routed to the specified address to obtain the signature of the identified individual. To validate the signator's identity, additional data may be obtained from the specified individual such as a driver's license number, or social security number may be gathered. This additional data would be keyed into the data acquisition device 20. A non-disclosure agreement obligating the package delivery company not to disclose the individual's personal identification information except to the requesting government agency may be displayed on the data acquisition device 20 for review by the recipient prior to signing the device or prior to giving their driver's license number.

Collecting Survey Data

In a further embodiment, survey data are collected by resources that are in the field for other purposes. The following paragraphs will describe embodiments of the present invention in a package delivery context where package delivery drivers already in the field for other purposes collect survey data. However, as one or ordinary skill in the art will appreciate, the survey data may be collected by any service company's resources already operating in a geographic area.

For collecting survey data, the driver's data acquisition device 20 is loaded with survey questions. Preferably, the questions are relatively short with simply yes/no answers such that the driver can quickly collect the data and proceed with his primary duties. However, it should be understood that the questions could be of any length and relatively long answers may be entered into the data acquisition device 20 using a keypad 33 or touch-screen 34.

In one embodiment, survey data is collected from a package recipient when the package is delivered. Alternatively, the driver could be routed to specific addresses to collect data.

This data would be transmitted to the data repository as generally described above with regard to other embodiments. The organization requesting the survey would be granted access to the data collected or the data could be sent directly to the organization from the data repository 13 or from the data acquisition device 20 to the organizations own data repository.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of verifying occupancy of a given address comprising the steps of:
    dispatching vehicles to locations within a geographic area to provide a service other than verifying occupancy;
    capturing signatures of respective occupants at respective locations in connection with providing said service at least some of said locations, wherein said signatures are digitized and stored in a data record in association with an address for respective locations with respective occupant's names, and dates of service at said respective locations;
    transferring said data records into a data repository from said data acquisition device;
    receiving a request for proof of occupancy evidence that a business or person occupied a select location within said geographic area, said request including a select address or a select occupant's name;
    querying said data repository to identify any data records associated with said request;
    determining whether data records associated with said request exist in said data repository; and
    if data records exist, providing proof of occupancy evidence for said select location based at least in part on said identified records.

2. The method of claim 1, wherein said occupant's name is a business name and said occupant's signature is the signature of a representative of said business.

3. The method of claim 1, wherein said proof of occupancy evidence includes said consignee name, said consignee signature, said address and said delivery date.

4. The method of claim 1, wherein said request is received from an entity other than the occupant.

5. The method of claim 4, wherein said entity is a government agency.

6. The method of claim 1, wherein said data records are created using a data acquisition device.

7. The method of claim 1, wherein said request is for information indicating occupancy of said select location in a time frame.

8. The method of claim 1, wherein said request includes an account number associated with an occupant of said select location.

9. The method of claim 1, wherein said step of providing proof of occupancy evidence comprises issuing a proof of occupancy letter indicating presence of an individual at said select location.

10. A method of providing proof of occupancy comprising the steps of:
    delivering a package to a consignee at a destination address;
    receiving a signature from said consignee using a data acquisition device when said package is delivered to said consignee;
    digitizing said signature using said data acquisition device to create a digitized signature;
        creating a delivery record associating said consignee's name, said digitized signature, said destination address, and a delivery date;
    storing said delivery record in a data repository;
    receiving a request for proof of occupancy evidence that a business or person occupied the destination address, said request including said consignee's name, said destination address or an account number associated with said consignee;
    querying said data repository to identify said delivery record in response to said request; and
    providing said proof of occupancy evidence.

11. The method of claim 10, wherein said consignee is a business.

12. The method of claim 10, wherein said proof of occupancy letter comprises said recipient's name, said recipient's address and said recipient's digitized signature.

13. The method of claim 10, wherein said request for said proof of occupancy is received from said consignee.

14. The method of claim 10, wherein said entity making said request for said proof of occupancy is selected from the group consisting of a government agency, a financial institution and an insurance company.

15. A method of gathering data comprising the steps of:
    providing a service wherein representatives are dispatched to locations within a geographic area;
    collecting data using a data acquisition device while said representatives are present at said locations;
    receiving a request to gather data unrelated to said service wherein the request is associated with an address that is within said geographic area;
    diverting one of said representatives to said address to gather said requested data; and
    collecting the requested data unrelated to said service.

16. The method of claim 15, wherein said requested data comprises responses to a plurality of survey questions and said survey questions are preprogrammed into said data acquisition device.

* * * * *